A. W. STRAUB.
Grinding-Mill.
No. 8,712. Reissued May 13, 1879.
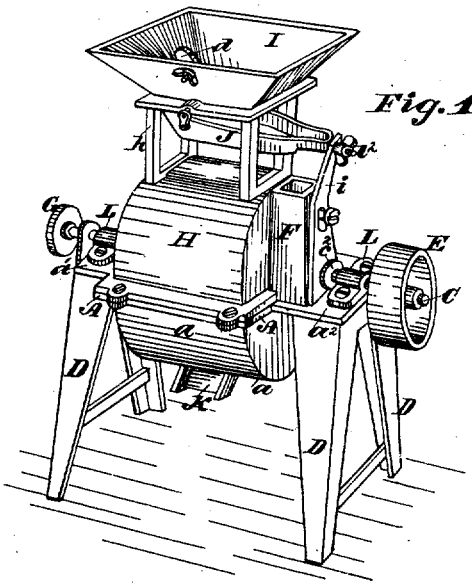
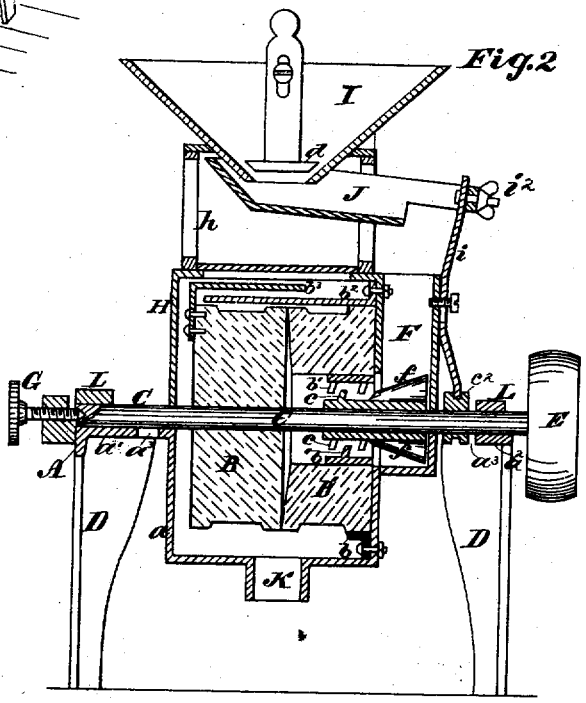
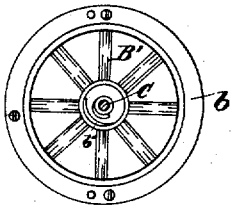
WITNESSES:
Thomas Williams
Richard Alexander
INVENTOR
Ambrose W. Straub
N. PETERS, PHOTO-LITHOGRAPHER, WASHINGTON, D. C.

UNITED STATES PATENT OFFICE.

AMBROSE W. STRAUB, OF PHILADELPHIA, PENNSYLVANIA.

IMPROVEMENT IN GRINDING-MILLS.

Specification forming part of Letters Patent No. 186,440, dated January 23, 1877; Reissue No. 8,712, dated May 13, 1879; application filed December 27, 1877.

*To all whom it may concern:*

Be it known that I, AMBROSE W. STRAUB, of Philadelphia, in the county of Philadelphia and State of Pennsylvania, have invented certain new and useful Improvements in Grinding-Mills; and I do hereby declare that the following is a full, clear, and exact description of the invention, that will enable others skilled in the art to which it appertains to make and use the same, reference being had to the accompanying drawings, and to the letters of reference marked thereon, which form a part of this specification, in which—

Figure 1 is a perspective, and Fig. 2 a longitudinal vertical section, of my improvements; Fig. 3, a face view of stationary stone as secured fast in a cast-iron ring, which is adapted to be bolted fast to the end of the stone-case of the bed-plate of the mill.

The object of my invention is to provide a good, cheap, durable, and simple vertical burr-stone grinding-mill; and consists in the novel construction, combination, and arrangement of parts having reference to the following points:

My invention consists in the combination, in a portable grain-grinding mill, of the following parts, namely: a ring for securing in place a non-revolving bed-stone, a bed-plate having a portion of the stone-case formed therein, and affording a support for said bed-stone, and having journal-bearings at either end for the support of the shaft with its attached revolving stone, and a removable cap or cover to be placed over both stones.

It further consists in combining, in a portable grain-grinding mill, the following-named parts, to wit: a stone-case consisting of an upper and a lower section, each of which is formed with two vertical straight sides and a horizontal curved side, the lower section being provided with journal-bearings on either side for the shaft, on which is supported the revolving burr, placed face to face with a non-revolving burr, the latter being secured to and supported by the lower section of the case, all as more particularly hereinafter set forth; and it further consists in certain other details of construction.

Referring to the accompanying drawings, A represents a cast-metal frame or bed-plate, said frame having the pillow-blocks $a^1$ $a^2$ for the shaft C, and the vertical concave cavity $a$ for the lower half of the stones B and B′, cast integral therewith. Said frame is supported horizontally upon four cast-iron legs, D D, which are bolted firmly to its under side, as shown.

The French burr-stones B B′ are supported vertically, the rotary one, B, upon the horizontal shaft C, and the other, B′, in a stationary manner, by means of a flanged ring, $b$, cast around fast to the stone, and bolted to the adjoining end of the concave cavity $a$. The stationary stone B′ has a large central hole, through which the shaft C passes freely, the inside of said hole being provided with spirally-arranged cast-iron pins $b^1$ $b^1$, which cooperate with like spiral pins $c$ $c$ on this part of the shaft C to carry the feed forward to the grinding-surfaces of the two stones by the rotary motions of the said shaft. The latter is supported in journal-bearings in the webs $a^1$ $a^2$ at either end of the frame A, and is provided with an over-necked band-pulley, E. Said shaft is held in place by the journal-boxes L L, and is adjusted longitudinally by a temper-screw, G, at the journal-box $a^1$ to regulate the degree of fineness in the products of the mill.

The hood or upper half, H, of the stone-case rests on the bed plate or frame A. It has a large hole in its top, through which the operator can readily see when the stones are in tram. This hole is adjustably covered by the usual name-plate.

The hopper I rests upon the stool $h$, and the latter is fixed on the top of the hood H. The bottom of the hopper has an adjusting-valve, $d$, to control its discharge, and under the hopper hangs the feed-shoe J, which is agitated in front by a cam, $c^2$, on the shaft C, with which it is connected by an adjustable bifurcated bar, $i$.

The inclination of the shoe J is adjusted by means of a screw-bolt and nut, $i^2$, in the end of the shoe, which screw-nut bears against the bifurcated bar. The feed passes from the shoe J down through a trunk, F, in which it comes into contact with a pair of spirally-arranged cutters, $f$ $f$, which also serve to direct the feed into the eye of the stone B′, the said cutters being fixed on the shaft C. Said trunk F is placed on the outside of the upper half of the stone-case, and extends from the top of the same down to the driving-shaft, as shown.

Near the inner side of each of the pillow-blocks, on which the shaft C rests, there is an opening, $a^3$, made through the frame or bed-plate A for any grit which may work out of the case to fall to the floor, and thus prevent it from getting into the journal-boxes. Fixed across the perimeter of the stationary stone B′ is a projecting bar, $b^2$, which extends across the perimeter of the rotating stone B, and nearly in contact with the latter, for the purpose of clearing the said perimeter of the stone B from adhesions, while a like bar, $b^3$, is fixed to the perimeter of said rotating stone, so as to extend across its perimeter and pass over the bar $b^2$ during the rotary motions of said stone, for the purpose of clearing the surrounding inside surface of the case from adhesions.

The stones B B′ are trammed by means of three set-screws in the end of the lower half of the case, the positions of which are indicated at $a^5$ in Fig. 3.

The bottom of said lower half of the case has an outlet-spout, K, for the escape of the products of the mill. The cutters *f f* on the shaft C are of great importance in grinding corn and cobs and similar articles used as food for cattle.

The whole of this improved portable mill is made of cast-iron, with the exception of the shaft C, which is of wrought-iron, and the grinding-disks B B′, which are of French burr-stone. Nearly all of the parts are easily detached from each other and as easily united together, which features are often of importance in transportation.

The pulley E being over-necked, the band can be instantly applied or detached without sewing or unsewing. The running stone being fixed on the shaft, the mill runs as steadily as a fly-wheel, and, therefore, does not shake the building in which it may be running.

The shaft and stones cannot wabble on the bed-plate. The grinding-stones can be removed for repicking, &c., without breaking loose from the floor-fastenings, and can be examined and trammed while they are running without disturbing the true position of other essential parts of the mill; the stones are not liable or likely to recoil and dull each other; there is economy in construction of the mill; the shaft is not obliged to support any part of the casing; the bearings wear evenly and equally, and always are in line with each other; the temper-screw always aligns with the shaft, and unskilled persons can readily manage the mill.

What I claim as my invention is—

1. In a portable grain-grinding mill, the combination of the following elements: the bed-plate A, formed with a concave recessed chamber and with journal-bearing surfaces at either end, thereby constituting the lower half of the stone-case, and forming the means for sustaining and securing the revolving and non-revolving burr-stones, the former being fixed upon a shaft placed in said journal-bearings, and the latter being secured thereto within said recessed chamber by its surrounding ring *b*, said stones being surmounted by a removable cap or cover, H, substantially as shown and described.

2. In a portable grain-grinding mill, the combination of the following elements: a stone-case composed of an upper and lower section, H and A, each of which is formed of two vertical straight sides and a horizontal curved side, the lower section, A, being provided with the journal-bearings $a^1$ $a^2$ on either side for the shaft C, upon which is supported the revolving burr B, placed face to face with a non-revolving burr, which is also secured to and supported by the lower section, A, of the stone-case, substantially as shown and described.

3. In a portable grinding-mill, the combination of the ring *b*, (or its equivalent,) for containing the bed-stone B′, when combined with and secured to the lower half of the cast-metal stone-case A, which has journal-bearings $a^1$ $a^2$ at each end for also supporting the spindle or shaft C, to which is secured the running stone B, placed face to face with the said bed-stone B′, substantially as shown and described.

4. In a portable grinding-mill, the bed-plate A, made as shown and described—that is, with the flat horizontal portion having pendent therefrom the concave *a*, formed with two vertical straight parallel sides, and the horizontal curved side adapted for receiving the lower halves of two vertically-arranged burr-stones, B and B′, with the pillow-blocks or bearings $a^1$ $a^2$ for the shaft C, with the spout or outlet-opening, and with the dirt-escape holes $a^3$, the bed-plate thus made being all cast in one piece.

In testimony that I claim the foregoing I have hereunto set my hand this 18th day of December, 1877.

AMBROSE W. STRAUB.

Witnesses:
EDWARD MORGAN,
CHAS. H. LUNGREN.